United States Patent
Engblom

(10) Patent No.: US 8,931,727 B2
(45) Date of Patent: Jan. 13, 2015

(54) DUAL-AIRCRAFT ATMOSPHERIC PLATFORM

(76) Inventor: William A. Engblom, Palm Coast, FL (US)

(*) Notice: Subject to any disclaimer, the term of this patent is extended or adjusted under 35 U.S.C. 154(b) by 547 days.

(21) Appl. No.: 13/414,451

(22) Filed: Mar. 7, 2012

(65) Prior Publication Data
US 2012/0232721 A1 Sep. 13, 2012

Related U.S. Application Data

(60) Provisional application No. 61/464,503, filed on Mar. 7, 2011.

(51) Int. Cl.
  *B64C 37/02* (2006.01)
  *G05D 1/10* (2006.01)
  *B64C 39/02* (2006.01)

(52) U.S. Cl.
  CPC ............... *G05D 1/104* (2013.01); *B64C 37/02* (2013.01); *B64C 39/022* (2013.01); *G05D 1/105* (2013.01); *B64C 2201/104* (2013.01); *B64C 2201/148* (2013.01); *Y10S 244/90* (2013.01)
  USPC .............................................. 244/2; 244/900

(58) Field of Classification Search
  USPC .......................... 244/1 R, 2, 3, 900, 903, 904
  See application file for complete search history.

(56) References Cited

U.S. PATENT DOCUMENTS

| | | | |
|---|---|---|---|
| 3,226,056 A | 12/1965 | Holland | |
| 4,248,394 A * | 2/1981 | Klumpp | 244/3 |
| 4,403,755 A * | 9/1983 | Gutsche | 244/53 R |
| 4,659,940 A | 4/1987 | Shepard | |
| 6,131,856 A | 10/2000 | Brown | |
| 6,913,224 B2 * | 7/2005 | Johansen | 244/3 |
| 7,263,939 B1 * | 9/2007 | Phillips | 114/39.11 |
| 7,530,527 B2 * | 5/2009 | Kelleher | 244/2 |
| 7,967,238 B2 * | 6/2011 | Fuchs et al. | 244/2 |
| 8,668,161 B2 * | 3/2014 | Heppe | 244/2 |
| 2001/0025900 A1 * | 10/2001 | Kramer | 244/2 |
| 2004/0169111 A1 | 9/2004 | Christof | |
| 2005/0067524 A1 * | 3/2005 | Johansen | 244/3 |
| 2006/0000945 A1 * | 1/2006 | Voss | 244/97 |
| 2009/0302149 A1 * | 12/2009 | Fuchs et al. | 244/2 |
| 2009/0302165 A1 | 12/2009 | Reinhard | |
| 2010/0327104 A1 * | 12/2010 | Sainct et al. | 244/3 |
| 2012/0234964 A1 * | 9/2012 | Heppe | 244/2 |
| 2012/0234965 A1 * | 9/2012 | Heppe | 244/2 |
| 2012/0312918 A1 * | 12/2012 | Heppe | 244/30 |
| 2013/0037650 A1 * | 2/2013 | Heppe | 244/2 |

\* cited by examiner

*Primary Examiner* — Benjamin P Lee
(74) *Attorney, Agent, or Firm* — Fleit Gibbons Gutman Bongini & Bianco PL; Paul D. Bianco; Gary S. Winer

(57) ABSTRACT

A platform including two winged aircraft are tethered during flight by a single tether near their respective centers of gravity. The tether is windable about a reel, so that a distance between the aircraft can be changed during flight. The aircraft contain avionics configured to enable autonomous flight using natural wind gradients. One aircraft imposes aerodynamic forces on the other, through the tether, while flying at an altitude where wind speed is significantly different than wind speed at an altitude of the other aircraft. The two aircraft cruise back and forth within a maximum distance from a station on the ground. Cruise conditions are established using an iterative computer algorithm which utilizes flight measurements. The aircraft communicate information between each other, and the ground, and contain a payload which performs a useful function at high altitudes.

20 Claims, 3 Drawing Sheets

DUAL-AIRCRAFT ATMOSPHERIC PLATFORM

CROSS REFERENCE TO RELATED APPLICATIONS

This application claims the benefit of related U.S. Provisional Patent Application No. 61/464,503, filed Mar. 7, 2011, the contents of which are incorporated herein by reference.

FIELD OF THE INVENTION

The present invention relates to a device for achieving high-altitude long endurance (HALE) station-keeping using atmospheric winds, for carrying communications, surveillance, or scientific equipment.

BACKGROUND OF THE INVENTION

Known high-altitude long endurance (HALE) aircraft which carry fuel, for example the Northrop Grumman's Global Hawk, are limited to one day of operation. NASA and DARPA have been pursuing the development of HALE aircraft which carry no fuel, and which are also know as "atmospheric satellites", including for example Boeing's Solar-Eagle. These craft are designed to collect solar power for propulsion and operations. Consequently, these aircraft must store large amounts of energy during the day to run propulsion during the night, requiring very large flexible wing covered in solar cells and heavy batteries. In the case of AeroVironment's Helios, a structural failure has resulted.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

SUMMARY OF THE INVENTION

In accordance with the disclosure, a stationkeeping apparatus, comprises first and second winged aircraft each containing fixed and moveable control surfaces and avionics configured to enable said respective first and second aircraft to perform autonomous flight using natural wind; a tether connectable near the center of gravity of said first and second aircraft; and a tether length adjuster operative to increase or decrease a length of said tether extending between said first and second aircraft when said tether is connected, to thereby change a distance between said first and second aircraft when said first and second aircraft are in flight.

In various embodiments thereof, said tether is at least 500 meters in length; said tether is between 500 meters and 8 kilometers in length; said first and second vehicles are configured to fly at different altitudes; at least one of said aircraft further includes a docking mechanism configured to attach and release said aircraft from a deployment vehicle; the apparatus further includes internal propulsion within at least one of said first and second aircraft; and, the apparatus further includes a wind turbine and generator configured to provide electricity during a flight of at least one of said first or second aircraft.

In a further embodiment thereof, the tether length adjuster includes a mechanism selected from the group consisting of: reel, spool, pulley, pinch rollers, moveable gripper, and gripping arm.

Further in accordance with the disclosure, a method of station-keeping, comprises connecting first and second winged aircraft together by a tether and a tether length adjustment mechanism, the first and second aircraft containing fixed and moveable control surfaces and avionics configured to enable said respective first and second aircraft to perform autonomous flight using a natural wind differential; and, changing a length of said tether, during flight of the first and second aircraft, using said tether length adjuster, to thereby change a distance between said first and second aircraft when said first and second aircraft are in flight.

In embodiments thereof, the method further includes flying the first and second aircraft, connected by the tether, at different altitudes with respect to each other, where the wind speed is substantially different at the different altitudes.

In other embodiments thereof, the method includes using a computer to execute software stored on non-transitory media, the software configured to determine a flight path for each of the aircraft, including to calculate a current relative wind velocity vector for the connected aircraft by subtracting the wind velocity vectors of each aircraft in accordance with the formula $\vec{V}_{RWP} = \vec{V}_{W1} - \vec{V}_{W2}$; calculate a flight path for forward and reverse segments of travel according to the formula $$\vec{H}_{fwd,rev} = \frac{\vec{V}_{RW} \times (\pm 1\hat{k})}{|\vec{V}_{RW}|};$$

and, estimate the required ground speed of connected aircraft, and roll, angle of attack, and relative horizontal separation of each of the connected aircraft during flight, by solving the following system of equations $$\vec{D}_S + \vec{L}_S + \vec{W}_S + \vec{T}_1 + \vec{F}_{C,S} = \vec{0}$$
$$\vec{D}_B + \vec{L}_B + \vec{W}_B + \vec{T}_N + \vec{F}_{C,B} = \vec{0}$$
$$\vec{D}_1 + \vec{L}_1 + \vec{W}_1 - \vec{T}_1 - \vec{T}_2 + \vec{F}_{C,1}\vec{0}$$
$$\cdots$$
$$\vec{D}_N + \vec{L}_N + \vec{W}_N - \vec{T}_{N-1} - \vec{T}_N + \vec{F}_{C,N} = \vec{0}$$

wherein the subscripts S and B represent the first and second aircraft, respectively, and numerical subscripts represent segments of the tether connecting the two aircraft, and wherein the vectors D, L, W, T, and $F_C$, represent the estimated drag, lift, weight, tether tension, and correction forces, respectively.

In yet further embodiments thereof, the method includes using a computer to execute software stored on non-transitory media, the software configured to calculate the solution to the system of equations including a set of inequality constraints; and, use an optimization procedure to solve the constrained system of equations.

In other embodiments thereof, the avionics are configured to attempt to maintain a yaw angle of substantially zero; the method includes having the first and second aircraft attain the target heading, ground speed, aircraft orientation, and respective horizontal separation, using the avionics, the tether and reel, and propulsion.

In a yet further embodiment thereof, the method further includes using a computer executing software stored on non-transitory media to calculate the difference between the actual acceleration and computing a correction force in accordance with the following formulas, in sequence $$\vec{a}_S = \vec{a}_{raw,S} + \frac{F_{T,S}}{m_S} \quad \vec{F}_{C,S} = \vec{F}_{C,S} - \vec{a}_S * m_S$$

$$\vec{a}_B = \vec{a}_{raw,B} + \frac{F_{T,B}}{m_B} \quad \vec{F}_{C,B} = \vec{F}_{C,B} - \vec{a}_B * m_B$$

wherein a is acceleration, $F_T$ is the current thrust force, m is vehicle mass, and the subscript raw is a measured value.

In an embodiment thereof, the method further comprises performing additional iterations of the system of equations, in which the correction force vector is adjusted until vehicle acceleration magnitudes are within a predetermined tolerance, $\epsilon$, of the null vector.

In another embodiment of the disclosure, a method of station-keeping, comprises connecting first and second winged aircraft together at different altitudes by a tether and a reel, the first and second aircraft containing fixed and moveable control surfaces and avionics configured to enable said respective first and second aircraft to perform autonomous flight using a natural wind speed differential between the different altitudes; changing a length of said tether, during flight of the first and second aircraft, using said reel, to thereby change a distance between said first and second aircraft when said first and second aircraft are in flight; and using a computer executing software stored on non-transitory media to calculate a flight path for forward and reverse segments of travel according to the formula $$\vec{H}_{fwd,rev} = \frac{\vec{V}_{RW} \times (\pm 1\hat{k})}{|\vec{V}_{RW}|}.$$

In an embodiment thereof, the method further comprises using a computer executing software stored on non-transitory media, the software configured to estimate the required ground speed of connected aircraft, and roll, angle of attack, and relative horizontal separation of each of the connected aircraft during flight, by solving the following system of equations $$\vec{D}_S + \vec{L}_S + \vec{W}_S + \vec{T}_1 + \vec{F}_{C,S} = \vec{0}$$

$$\vec{D}_B + \vec{L}_B + \vec{W}_B + \vec{T}_N + \vec{F}_{C,B} = \vec{0}$$

$$\vec{D}_1 + \vec{L}_1 + \vec{W}_1 - \vec{T}_1 - \vec{T}_2 + \vec{F}_{C,1}\vec{0}$$

$$...$$

$$\vec{D}_N + \vec{L}_N + \vec{W}_N - \vec{T}_{N-1} - \vec{T}_N + \vec{F}_{C,N} = \vec{0}$$

wherein the subscripts S and B represent the first and second aircraft, respectively, and numerical subscripts represent segments of the tether connecting the two aircraft, and wherein the vectors D, L, W, T, and $F_C$, represent the estimated drag, lift, weight, tether tension, and correction forces, respectively.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
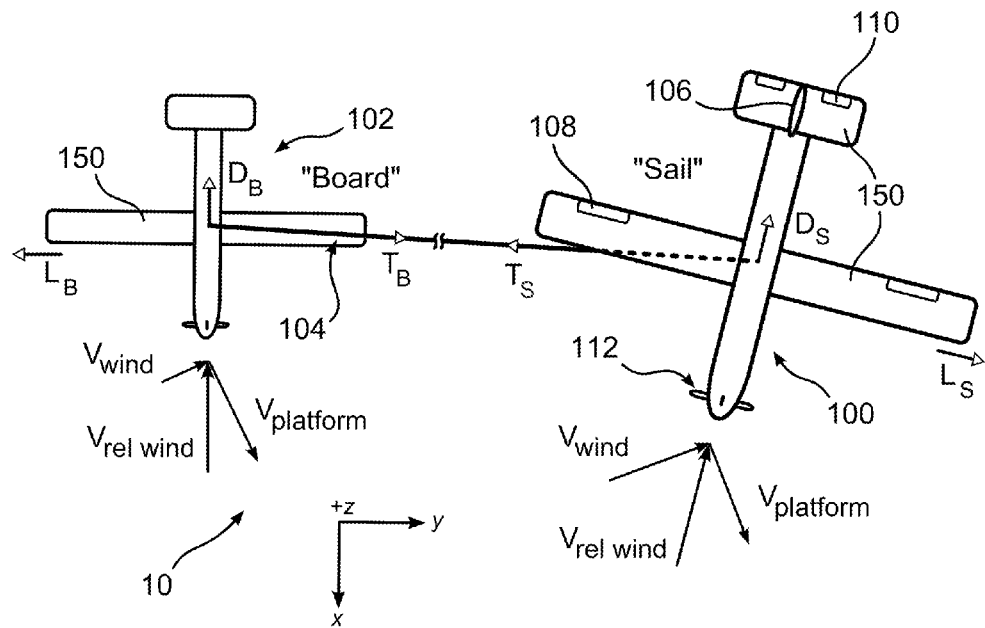
FIG. 1 diagrammatically depicts two aircraft of the disclosure, as viewed from above, connected by a tether.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The present disclosure provides for establishing an airborne platform 10 above a fixed ground station, or any desired location upon the Earth, using available wind power to effectively sail within the atmosphere. With reference to the figures, the platform 10 consists of two unmanned aerial vehicles, advantageously autonomous, which are positioned at different altitudes, and are connected to each other via a single tether. The vehicles use persistent atmospheric wind velocity gradients to maintain flight within a prescribed distance above a desired location on the ground for an extended period of time, for example days, weeks, months, or years. The two aircraft, or vehicles 100, 102, comprise unmanned, fixed-winged aircraft with control surfaces, which are connected via a single line or cable or tether 104, which is advantageously maintained in tension.

The present invention offers a practical, alternative device and method for achieving HALE station-keeping, which may be understood in some aspects in consideration of certain principles of kite surfing, to effectively sail within the stratosphere using atmospheric wind gradients. It is useful to consider that all sailing devices utilize a difference in the relative wind (or water) velocity vector between two airfoils (or hydrofoils) to simultaneously provide aerodynamic thrust and enable travel along a predefined path, even upwind, without external propulsion. For example, kite surfing requires an airfoil and a hydrofoil connected via a rope. Buoyancy in these devices provides a lift force but does not provide this horizontal thrust. The present invention offers a practical means for station-keeping within the stratosphere incorporating aspects of this premise.

It can be useful to consider kite surfing, in order to understand the cruise conditions of the connected vehicles of the disclosure. A substantial lateral hydrodynamic force is exerted on a surfboard, also transmitted through the surfer, to the rope connected to the kite. The ability of a kite surfer to travel normal to the wind, or to an extent upwind, is made possible because the relative wind direction with respect to the kite, and relative water direction with respect to the surfboard, are sufficiently different. At a given point in time, one of the vehicles 100, 102 may function in the manner of a kite (or "sail"), and the other as a surfboard (or "board"). In accordance with the disclosure, each is positioned at different altitudes which experience substantially different wind velocity vectors. The vehicles orient their airfoils to use this difference in wind velocity to produce an effective aerodynamic thrust while maintaining a desired heading.

Figure 2:
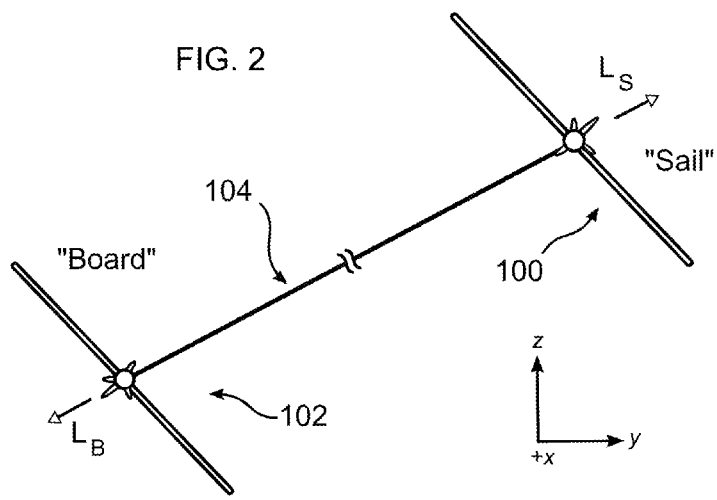
FIG. 2 depicts the aircraft of FIG. 1, viewed from ahead.

With reference to FIG. 1, each aircraft moves with the ground speed and heading indicated by $V_{platform}$, and is oriented towards its respective relative wind direction (i.e., no sideslip). The sail, vehicle 100, produces a forward aerodynamic thrust via a component of its lift vector ($L_S$) in the direction of the ground track. The board, vehicle 102, produces an upwind force via a component of its lift vector ($L_B$). Each vehicle holds an angle-of-attack and roll angle, as observed in FIG. 2. Consequently, the sail is leading the board along its flight heading, and the board is leading the sail upwind, such that the platform can maintain a cruise flight condition. It should be noted that the previously described aerodynamic roles of each aircraft can switch, combine, and can become ambiguous under different atmospheric wind conditions. For example, the "board" vehicle 102 is shown to be operating at a lower altitude than the "sail" vehicle 102 in FIGS. 1-2, but the opposite is also possible, with the upper vehicle 100 operating as a board, and the lower vehicle operating as a sail.

Weather balloon (radiosonde) data are taken regularly at numerous locations in the world and have established that the atmospheric wind gradients are persistent, and tend to be strongest in the vicinity of the tropopause, which is typically between 11 and 17 km, making the upper troposphere and lower stratosphere advantageous locations for carrying out station-keeping in accordance with the present disclosure. However, to avoid commercial air traffic and mitigate weather factors, a minimum cruise altitude of 18 kilometers (60,000 ft) is also advantageous.

Since wind velocity gradients at a given altitude can change significantly over the course of a 24-hour period, based on National Weather Service radiosonde data, it is advantageous that the present invention be capable of occasionally holding altitude using relatively weak wind velocity gradients, thereby avoiding frequent changes in altitude to seek larger wind velocity gradients. It can be shown analytically that the capability of the present invention to hold altitude in weak velocity gradients is directly related to the glide slope (or lift-to-drag) at which it operates. The present invention offers an optimal glide slope for utilizing weak velocity gradients. Two glider-like aircraft, or vehicles 100, 102, are configured to possess very high glide ratios, for example 40 or more, although significantly lower or higher ratios may be used with the disclosure, and are connected by a single, thin tether 104 with a large tensile strength. In accordance with the disclosure, no additional connecting components, wires, or risers are needed, to improve the overall glide ratio of the connected vehicles 100, 102 and platform 10.

Figure 3:
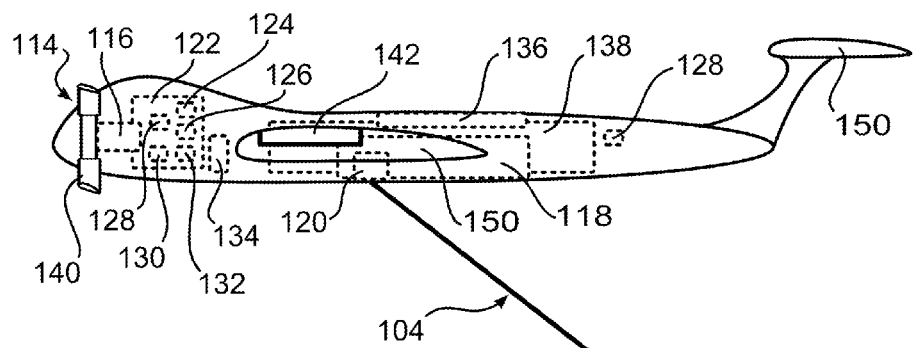
FIG. 3 depicts an aircraft of FIG. 1, illustrating additional detail, including internal components.
Figure 4:
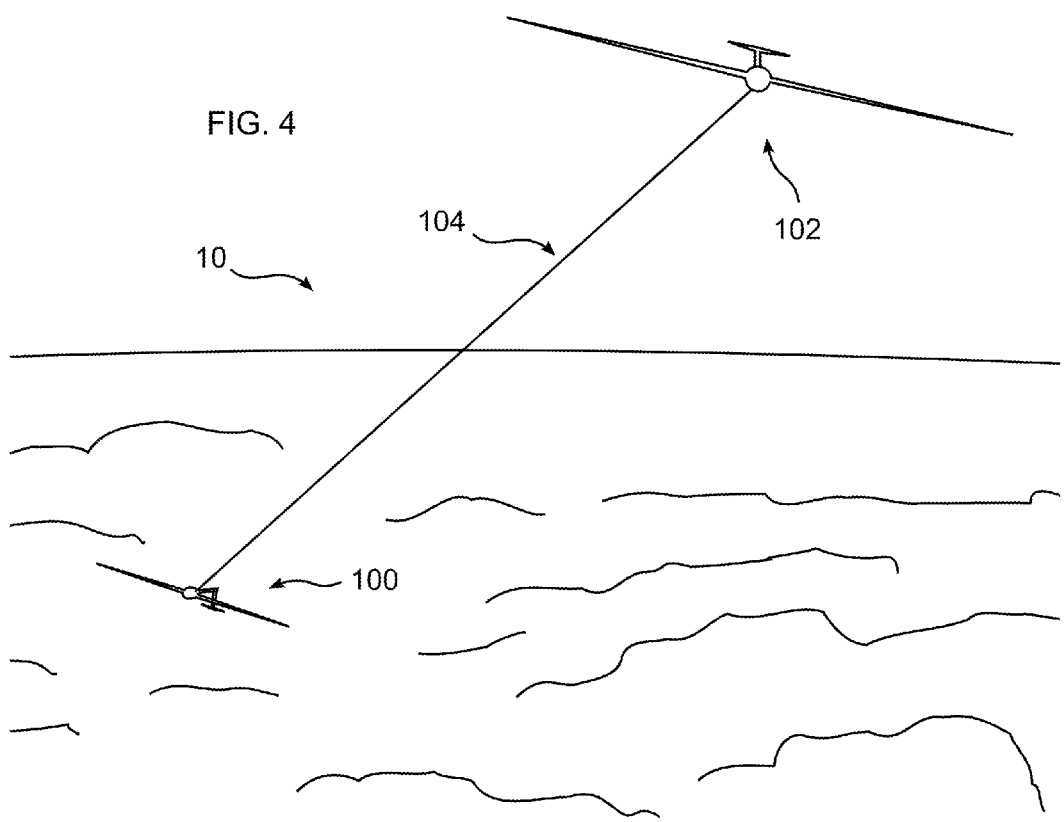
FIG. 4 depicts the aircraft of FIGS. 1-4, in flight above a cloud cover, proximate the lower stratosphere.

With reference to FIG. 3, each vehicle 100, 102 carries a wind turbine 114 and generator 116 for power generation, batteries 118 for energy storage, a tether length adjuster 120 for changing the tether 104 length, avionics equipment 122 for flight control and communications with ground and between aircraft including GPS 124, inertial measurement unit 126, sensors 128, transmitter 130, receiver 132, and computer 134. Additionally included is a docking mechanism 136 for mating aircraft for deployment and retrieval, and a payload 138. Additionally included fixed and moveable control surfaces 150 are provided which produce aerodynamic forces as air flows over them, as is understood within the art. Control surfaces include for example, but are not limited to, rudder 106, aileron 108, and elevator 110, which are shown by example only for vehicle 102, in FIG. 1.

As may be seen in the figures, tether 104 is connected to each vehicle 100, 102 at the approximate center-of-gravity of each vehicle 100, 102, to minimize torque induced by the aircraft on each other via the tether, which could interfere with, or reduce efficiency of, flight of vehicles 100, 102. A tether length adjuster 120 in one or both vehicles 100, 102 is configured to wind and unwind tether 114 using a motor (not show), for example an electric motor or spring, to adjust a length of tether 114 extending between vehicles 100, 102, in order to change a distance between vehicles 100, 102, as needed. Tether 104, of sufficient length to separate vehicles 100, 102 the necessary distance, is wound and unwound from tether length adjuster 120, contained within at least one of the vehicles 100, 102, to adjust altitude separation distance between vehicles 100, 102. The length of the tether will necessarily be large to accommodate the maximum three-dimensional separation distance between vehicles 100, 102 over a long duration flight. For example, one embodiment includes a 2-km long tether, but a range of 500-m to 8-km is in accordance with the disclosure. While a single tether 104 is advantageous for the reasons described herein, it should be understood that multiple tethers may extend between vehicles 100, 102, provided they do not prevent the functioning of vehicles 100, 102 as described herein.

Tether length adjuster 120 may comprise one or more cylinders, reels or spools associated with either or both of vehicles 100, 102, or may be positioned along the length of tether 104. Alternatively, tether length adjuster 120 may have the form of a tether length adjustment mechanism separated from a storage area for untensioned tether material. The tether length adjustment mechanism may include a reel, spool, pulley, pinch rollers, or moveable grippers or gripping arms. Excess tether material may be wound upon a spool or reel, or it may be layed, folded, flaked, or collected in a storage area or container.

Tether length adjuster 120 may further be enabled to translate, or move about, within vehicle 100 and or 102 to provide an additional ability for vehicle control. Such movement of tether length adjuster 120 may be accomplished by any known means, including mechanical actuators, for example an electric motor or hydraulic piston, advantageously controlled by computer 134.

Tether 104 is advantageously of light weight and great strength, due to its potential very large length. Tether lengths of at least 500-m are necessary to routinely capture sufficiently different wind velocities for cruise operations in the lower stratosphere. Materials may include, for example, a para-aramid synthetic fiber, carbon fiber, a material formed with nano-tubes, or other material offering high tensile strength to weight. Vehicles 100, 102 and onboard components are similarly advantageously formed with like lightweight and strong materials, to increase efficiency of platform 10 overall.

Both vehicles 100, 102 possess a wind turbine 114 including a rotor 140 of suitable size which is operative as a wind turbine connectable to a generator 116, to provide electrical power storable in one or more batteries 118 which provide electrical power to run avionics equipment, control surfaces, and to supply power to the payload. Supplementary power generation using photovoltaic cells or films (not shown) is in accordance with the disclosure. Other forms of onboard power generation may be employed, including for example the use of a radioisotope thermoelectric generator (RTG), as currently known or hereinafter developed.

While it is advantageous for both vehicles 100, 102 to have an independent power supply, it should be understood that a power cable may be run from one vehicle 100, 102 to the other vehicle 100, 102, however this would tend to increase the thickness of tether 104, and increase drag, and otherwise adversely impact vehicle dynamics, for example due to a greater weight of tether 104.

Turbine and generator 114, 116 may alternatively provide a propulsive thrust, when needed, for example in the absence of sufficient wind, by internally configuring electrical turbine-generator 114 to act as an electric motor by consuming electrical power. In addition to turbine and generator 114, 116, ducted fans or propellers (not shown), or other propulsion devices may be provided in accordance with the disclosure.

Vehicles advantageously store energy with batteries 118, however it should be understood that any other known or hereinafter developed energy storage system may be used, including a flywheel in a kinetic energy recovery system. For example, portions of wind turbine 114 may function as a flywheel. This energy, if not stored in a suitable form of electricity, may be converted to appropriate voltage voltages for operating the avionics equipment 122, or other devices which require electrical energy.

Avionics equipment 122 within each vehicle 100, 102 includes flight control related devices such as GPS 124 and inertial measurement unit 126 to determine aircraft position, inertial velocity and acceleration, orientation, angular speed and acceleration. Transmitters 130 and receivers 132 are additionally included to enable communications between vehicles 100, 102, and between vehicles 100, 102 and ground sites. Communication from platform 10 to platform 10 may also be required, in a manner analogous to cell tower or satellite network communication. Sensors 128 configured to measure relative wind velocity magnitude and direction, air pressure, air temperature, and air density, are advantageously provided for facilitating flight operations.

Payload 138 may consist of communications, surveillance, or other equipment, for example, advantageously located within a radio-transparent portion of the aircraft nose, fuselage, or wing. Civilian or military payloads may be carried, including scientific research equipment, and emergency or non-emergency telecommunications equipment, as additional examples.

Both vehicles advantageously possess a combination of additional moveable aerodynamic surfaces to control vehicle orientation, including rudder 106, aileron 108, and elevator 110, although other control surfaces may be employed as is known in the art, or hereinafter developed, to facilitate maneuvers and to maintain a heading in fluctuating winds.

Having two similarly-equipped vehicles provides, among other advantageous functionality, an ability of vehicles 100, 102 to swap altitudes and aerodynamic functions. Accordingly, it is advantageous to have two similar or identical aircraft.

Deployment of the platform will require that the two vehicles 100, 102 are mutually connected, advantageously prior to being deployed. A docking mechanism 136 is used to connect to a deployment vehicle, for example a balloon, helicopter, or fixed wind aircraft (not shown). The deployment vehicle raises vehicles 100, 102 to a height at which they may assume self-flight, which may be different than a final desired altitude. If a balloon is used as the deployment vehicle, vehicles 100, 102 may be used to control the balloon's horizontal position, and the orientation of each vehicle, while docked. At a desired altitude, vehicles 100, 102 can be released from the deployment vehicle using docking mechanism 136. Vehicles 100, 102 may be released separately, so that tether 114 may extend a desired length. The aircraft will use onboard propulsion 114 and change tether length, as necessary, during approach to target cruise altitudes. In an embodiment, tether 114 may initially be fully retracted so that vehicles 100, 102 are securely joined prior to deployment. Tether 114 may then be partially or fully extended before or after deployment.

Retrieval of the platform 10 is achieved by reversing the order of deployment. Alternatively, the retrieval method may be a reversal of a different deployment method than was used to deploy vehicles 100, 102. In an embodiment, one of vehicles 100, 102 deploys a parachute to slow vehicles 100, 102 before or after re-docking Advantageously, vehicles 100, 102 control or participate in landing.

The vehicles 100, 102 attain cruise flight conditions using an algorithm of the disclosure, the steps of which are discussed below, and diagrammed in FIG. 5. Known algorithms for determining the orientation and speed needed to achieve powered aircraft cruise for given atmospheric conditions and required heading are not appropriate for the present invention due to the strong and time-delayed aerodynamic interactions among the two aircraft and tether.

The vehicles 100, 102 are to be initially positioned at pre-determined altitudes and flight path heading in order to use a favorable wind velocity gradient. These pre-determined values are provided to the platform either just before or during deployment. For example, ground stations periodically receive atmospheric wind profiles from weather balloons. This radiosonde data is advantageously used to identify and update the optimal pair of altitudes for station-keeping. The ground site transmits these best altitudes to the platform 10, as needed, to have vehicles 100, 102 relocate to a pair of altitudes which are expected to facilitate station-keeping. In another embodiment, the deployment vehicle determines suitable initial altitudes for cruise operations and provides these instructions to the platform during ascent, before deployment.

To remain within a prescribed distance of a ground station the vehicles are to reverse course (or tack) such that the platform travels approximately back-and-forth along a specified ground track. The vehicles 100, 102 will perform an approximately 180° turn, without exploiting the sail-board dynamic of the disclosure, and with negligible tether tension, in such a manner as to avoid interference between tether 104 and vehicle 100 or 102. Since the range of altitudes for the platform is also limited, station-keeping is confined to a cylindrical region of airspace, advantageously above commercial airspace in the Stratosphere.

Each vehicle 100, 102 periodically, or as needed, monitors the atmospheric conditions, including for example wind speed and direction, air pressure, air temperature using onboard avionics 122 including sensors 128, at its respective altitude. This information is transmitted by transmitter 130 and received by receiver 132, thereby sharing this information with the other vehicle. Each vehicle 100, 102 also may receive data transmissions with updated atmospheric conditions, for example as measured by weather balloons.

Computers 134 calculate the platform flight path for a desired sailing mode of operation for platform 10. Specifically, software executing in computers 134 calculate the current relative wind velocity for platform 10 ($V_{RWP}$) by subtracting the two vehicle's 100, 102 wind velocity vectors, as shown in Equation 1. If a modest vertical ascent or descent is desired, the appropriate vertical velocity component may be added to the result of Equation 1. The cross product of the relative wind velocity vector is taken with vertical direction unit vector (both upward and downward), to arrive at the "forward" and "reverse" flight path heading vectors (H), as shown in Equation Set 2. These headings follow the same ground track. It is advantageous to operate in this manner since the minimum aircraft speed during the back-and-forth cruise is maximized, which results in a maximized Reynolds number and thus better airfoil performance, including glide slope. The foregoing mode of operation has the additional advantage of minimizing the impact of fluctuating winds on aircraft performance by minimizing changes to aircraft angle-of-attack due to increased vehicle momentum. In accordance with the disclosure, it has been determined that this choice of heading is the least difficult to satisfy when weak wind velocity gradients are present and station-keeping is required.

$$\vec{V}_{RWP} = \vec{V}_{W1} - \vec{V}_{W2} \quad \text{Equation 1}$$

$$\vec{H}_{fwd} = \frac{\vec{V}_{RWP} \times (+1\hat{k})}{|\vec{V}_{RWP}|} \quad \text{Equation Set 2}$$

$$\vec{H}_{rev} = \frac{\vec{V}_{RWP} \times (-1\hat{k})}{|\vec{V}_{RWP}|}$$

It should be understood that, using onboard avionics 122 and sensors 128, each vehicle 100, 102 may determine in real time an optimum flight path that produces the least undesired change in altitude and horizontal displacement, whereby stationkeeping is optimized. Accordingly, a flight path may not be near normal to the platform relative wind vector at any given point in time.

Given the aircraft altitudes and intended flight path heading, one or both onboard computers 134 calculate the remaining required elements of the platform state vector, including platform ground speed ($V_{platform}$), angle-of-attack ($\alpha$) and roll ($\phi$) orientations for each vehicle 100, 102, and separation distance in the horizontal plane ($\Delta X$, $\Delta Y$) between vehicles 100 and 102. The required yaw angle ($\beta$) is always advantageously zero, or substantially zero, for each vehicle 100, 102. This procedure substantially simultaneously solves the equations of motion for constant speed, subject to additional constraints, as described below. With reference to Equation Set 3, the equations of motion are applied in three-dimensions (i.e., one vector equation set) to each vehicle 100, 102, per the subscripts for sail (S) and board (B), respectively, and to a number of segments (N) of the exposed tether, per the subscripts 1 to N. These forces include drag ($\vec{D}$) and lift ($\vec{L}$) vectors, along and normal to the heading vector, respectively, weight ($\vec{W}$), tether tension ($\vec{T}$), and force correction ($\vec{F}_C$). The drag and lift forces are functions of the current atmospheric conditions, the aforementioned cruise condition parameters, and pre-established aircraft aerodynamic coefficients. The drag created by onboard turbines is advantageously included in the vehicle drag vectors. Propulsive thrust is advantageously not active during cruise operations, and thus is not included in these equations. Since no consumables are carried onboard the weights are known constants. The correction force is set to null for the first iteration of these computations. An additional list of inequality constraints are also imposed, for example, to limit tether length, tether stress, aircraft dynamic pressure limits, available wind power, as needed, to ensure the resulting state vector solution is practical.

Equations of Motion for Cruise Operation     Equation Set 3

$$\vec{D}_S + \vec{L}_S + \vec{W}_S + \vec{T}_1 + \vec{F}_{C,S} = \vec{0}$$
$$\vec{D}_B + \vec{L}_B + \vec{W}_B + \vec{T}_N + \vec{F}_{C,B} = \vec{0}$$
$$\vec{D}_1 + \vec{L}_1 + \vec{W}_1 - \vec{T}_1 - \vec{T}_2 + \vec{F}_{C,1}\vec{0}$$
$$\ldots$$
$$\vec{D}_N + \vec{L}_N + \vec{W}_N - \vec{T}_{N-1} - \vec{T}_N + \vec{F}_{C,N} = \vec{0},$$

An optimization procedure, for example a linear optimization (LO) solver, is advantageously used to solve this system of equations with additional constraints. Such solver may be incorporated in software executing from non-transitory media connected to computer 134, further enabling vehicles 100, 102 to fly autonomously, effectively.

In an embodiment, the equations of motion for both the forward and reverse segments of travel by platform 10 are solved simultaneously to establish target cruise conditions for both segments. Alternatively, these equations may be solved at separate times for the forward and reverse segments of travel, as needed.

Additional iterations of the system of equations in Equation Set 3 may be carried out, in which the correction force vector is adjusted until vehicle acceleration magnitudes are within a predetermined tolerance, $\epsilon$, of the null vector.

When a practicable solution is found by the LO solver, the vehicles may be further controlled by computer 134, which is programmed to enable propulsion, control systems, and unwinding/rewinding of the tether, as necessary to attain the target platform ground speed, aircraft orientations, and relative separation of vehicles 100, 102.

If the LO solver finds no practicable solution, the computers 134 may attempt to recompute the required state vector after adding a descent speed. Alternatively, the computers may instruct the vehicles to attain new altitudes for improved atmospheric wind conditions, based on currently available wind profile information, and restart this algorithm, as outlined in FIG. 5. Alternatively, the platform may also communicate with a ground station to get new instructions as to which new altitudes to acquire.

With the target cruise conditions established, platform 10 advantageously uses onboard propulsion and winding/unwinding of tether 104 to change aircraft velocity and separation where this is possible within the constraints of wind velocity and direction, and or the non-powered flight abilities of the vehicles 100, 102. Subsequently, each aircraft will change orientation to attain the required platform state vector predicted by the LO routine. Once this state vector is attained, each aircraft measures its respective acceleration vector. The propulsion system is advantageously in idle mode or inactive during this measurement; however, the acceleration caused by any propulsive thrust must be added to these measurements, per Equation Set 4, using the vehicle mass.

$$\vec{a}_S = \vec{a}_{raw,S} + \frac{F_{T,S}}{m_S} \quad \text{Equation Set 4}$$

$$\vec{a}_B = \vec{a}_{raw,B} + \frac{F_{T,B}}{m_B}$$

In Equation Set 4, a is acceleration, $F_T$ is the current thrust force, m is vehicle mass, and the subscript raw is a measured value.

If the resulting measured accelerations are within an acceptable tolerance of the null vector, the platform has attained cruise conditions. Otherwise, this measured acceleration represents the acceleration error and would, for example, be caused by inaccurate estimate of the tether drag. These two acceleration vectors are converted into a distribution of force corrections to be applied within the equations of motion (Equation Set 3), which are re-solved to obtain a corrected platform state vector. This procedure may be repeated (iterated) in which the force corrections are updated each iteration, until the measured flight acceleration is within acceptable tolerance of the null vector, as shown in Equation Set 5.

$$\vec{F}_{C,S} = \vec{F}_{C,S} - \vec{a}_S * m_S \quad \vec{F}_{C,B} = \vec{F}_{C,B} - \vec{a}_B * m_B \qquad \text{Equation Set 5:}$$

The avionics equipment 122 advantageously employs additional logic to adjust the cruise condition parameters for improved cruise performance, while maintaining a flight path heading, as necessary.

The computations required to establish platform cruise are advantageously completed by one or more onboard computers 134. Atmospheric data measurements and the computational results are advantageously shared between the aircraft via wireless communications. These computations may also be carried out at a nearby ground site and transmitted to the aircraft. In the latter case, each aircraft advantageously transmits its measured atmospheric data to the ground site.

Figure 5:
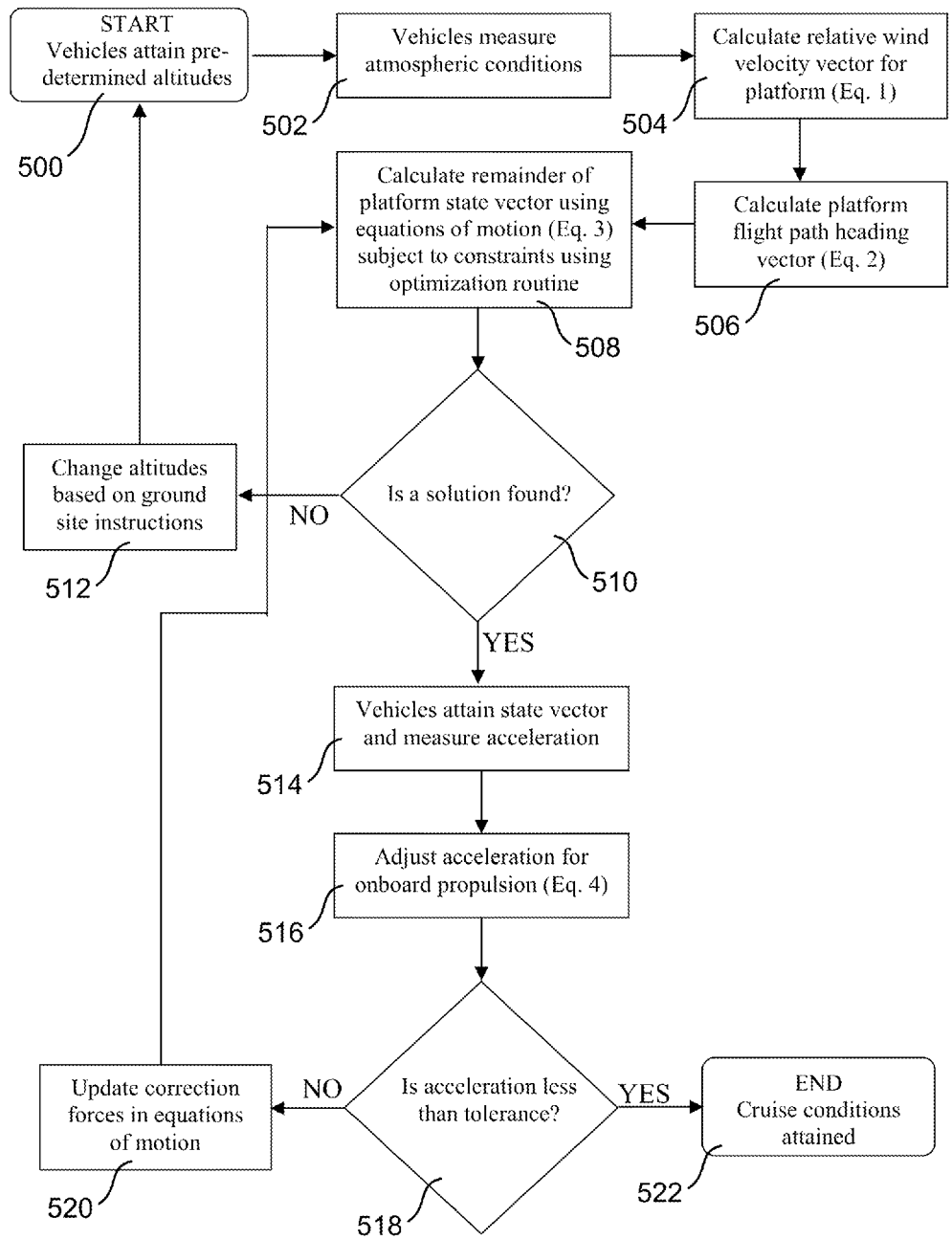
FIG. 5 is a flowchart in accordance with the disclosure, for achieving cruise flight conditions.

Referring now to FIG. 5, an outline of a procedural flow is diagrammed. At a starting point (500), vehicles 100, 102, using avionics 122, attain predetermined altitudes, and then measure atmospheric conditions (502). Next, a relative wind velocity vector for platform 10 is calculated (504) according to Equation 1, followed by calculating a platform 10 flight path heading vector in accordance with Equation Set 2 (506). Additionally, a remainder of platform 10 state vectors are calculated using equations of motions in accordance with Equation Set 3, subject to constraints using an optimization routine (508). If the optimization routine does not find a solution (510), the platform 10 changes altitude, advantageously in accordance with ground site instructions (512), and the process resumes at step 500. If the optimization routine finds a solution (510) within predefined parameters in step 508, vehicles 100, 102 are controlled to attain the calculated state vector, and measure acceleration (514). In step 516, acceleration is adjusted for onboard propulsion in accordance with Equation Set 4. If acceleration is not less than a predetermined tolerance (518), correction forces in equations of motion are updated (520), and flow is passed to step 508, and calculations pertaining to state vector are performed again. If acceleration is less than a predetermined tolerance (518), cruise conditions have been attained, and the process ends (522).

All references cited herein are expressly incorporated by reference in their entirety. It will be appreciated by persons skilled in the art that the present invention is not limited to what has been particularly shown and described herein above. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A method of station-keeping, comprising:
connecting first and second winged aircraft together by a tether and a tether length adjustment mechanism, the first and second aircraft containing fixed and moveable control surfaces and avionics configured to enable said respective first and second aircraft to perform autonomous flight using a natural wind differential, the avionics including software stored on non-transitory media, the software configured to determine a flight path for each of the aircraft, including to calculate a current relative wind velocity vector for the connected aircraft by using data obtained by subtracting the wind velocity vectors of each aircraft in accordance with the formula $\vec{V}_{RW} = \vec{V}_{W1} - \vec{V}_{W2}$; and changing a length of said tether, during flight of the first and second aircraft, using said tether length adjustment mechanism, to thereby change a distance between said first and second aircraft when said first and second aircraft are in flight.

2. The method of claim 1, further including flying the first and second aircraft, connected by the tether, at different altitudes with respect to each other, where the wind speed is substantially different at the different altitudes.

3. The method of claim 1, wherein the software is further configured to calculate a flight path for forward and reverse segments of travel according to the formula $$\vec{H}_{fwd,rev} = \frac{\vec{V}_{RW} \times (\pm 1\hat{k})}{|\vec{V}_{RW}|}.$$

4. The method of claim 1, wherein the avionics are configured to attempt to maintain a yaw angle of substantially zero.

5. The method of claim 1, the software further configured to estimate the required ground speed of connected aircraft, and roll, angle of attack, and relative horizontal separation of each of the connected aircraft during flight, by solving the following system of equations $$\vec{D}_S + \vec{L}_S + \vec{W}_S + \vec{T}_1 + \vec{F}_{C,S} = \vec{0}$$
$$\vec{D}_B + \vec{L}_B + \vec{W}_B + \vec{T}_N + \vec{F}_{C,B} = \vec{0}$$
$$\vec{D}_1 + \vec{L}_1 + \vec{W}_1 - \vec{T}_1 - \vec{T}_2 + \vec{F}_{C,1} \vec{0}$$
$$\ldots$$
$$\vec{D}_N + \vec{L}_N + \vec{W}_N - \vec{T}_{N-1} - \vec{T}_N + \vec{F}_{C,N} = \vec{0}$$

wherein the subscripts S and B represent the first and second aircraft, respectively, and numerical subscripts represent segments of the tether connecting the two aircraft, and wherein the vectors D, L, W, T, and $F_C$, represent the estimated drag, lift, weight, tether tension, and correction forces, respectively.

6. The method of claim 5, wherein the software is further configured to calculate the solution to the system of equations including a set of inequality constraints.

7. The method of claim 5, wherein the software is further configured to use an optimization procedure to solve the constrained system of equations.

8. The method of claim 5, further comprising performing additional iterations of the system of equations, in which the correction force vector is adjusted until vehicle acceleration magnitudes are within a predetermined tolerance, $\epsilon$, of the null vector.

9. The method of claim 1, further having the first and second aircraft attain the target heading, ground speed, aircraft orientation, and respective horizontal separation, using the avionics, the tether and tether length adjustment mechanism, and propulsion.

10. The method of claim 1, wherein the software is further configured to calculate the difference between the actual acceleration and computing a correction force in accordance with the following formulas, in sequence $$\vec{a}_S = \vec{a}_{raw,S} + \frac{F_{T,S}}{m_S} \quad \vec{F}_{C,S} = \vec{F}_{C,S} - \vec{a}_S * m_S$$

$$\vec{a}_B = \vec{a}_{raw,B} + \frac{F_{T,B}}{m_B} \quad \vec{F}_{C,B} = \vec{F}_{C,B} - \vec{a}_B * m_B$$

wherein a is acceleration, $F_T$ is the current thrust force, m is vehicle mass, and the subscript raw is a measured value.

11. The method of claim 1, wherein said tether is a single tether connectable near the center of gravity of said first and second aircraft at a single point.

12. A station-keeping apparatus, comprising:
first and second winged aircraft each containing fixed and moveable control surfaces and avionics configured to enable said respective first and second aircraft to perform autonomous flight;
a tether connectable near the center of gravity of said first and second aircraft;
at least one reel connected to at least one of said first and second winged aircraft and operative to increase or decrease a length of said tether extending between said first and second aircraft when said tether is connected, to thereby change a distance between said first and second aircraft when said first and second aircraft are in flight;
a computer connected to at least one of said first and second aircraft and operative to execute software stored on non-transitory media configured to calculate a flight path for forward and reverse segments of travel of said first and second aircraft according to the formula $$\vec{H}_{fwd,rev} = \frac{\vec{V}_{RW} \times (\pm 1\hat{k})}{|\vec{V}_{RW}|}.$$

13. The apparatus of claim 12, wherein said tether is at least 500 meters in length.

14. The apparatus of claim 12, wherein said tether length is between 500 meters and 8 kilometers in length.

15. The apparatus of claim 12, wherein said first and second vehicles are configured to fly at different altitudes.

16. The apparatus of claim 12, wherein at least one of said aircraft further includes a docking mechanism configured to attach and release said aircraft from a deployment vehicle.

17. The apparatus of claim 12, further including onboard propulsion within at least one of said first and second aircraft.

18. The apparatus of claim 12, further including a wind turbine and generator configured to provide electricity during a flight of at least one of said first or second aircraft.

19. The apparatus of claim 12, wherein the tether length adjuster includes a mechanism selected from the group consisting of: reel, spool, pulley, pinch rollers, moveable gripper, and gripping arm.

20. The apparatus of claim 12, wherein said software is further configured to estimate the required ground speed of said first and second connected aircraft, and roll, angle of attack, and relative horizontal separation of each of the connected aircraft during flight, by solving the following system of equations $$\vec{D}_S + \vec{L}_S + \vec{W}_S + \vec{T}_1 + \vec{F}_{C,S} = \vec{0}$$

$$\vec{D}_B + \vec{L}_B + \vec{W}_B + \vec{T}_N + \vec{F}_{C,B} = \vec{0}$$

$$\vec{D}_1 + \vec{L}_1 + \vec{W}_1 - \vec{T}_1 - \vec{T}_2 + \vec{F}_{C,1} \vec{0}$$

$$\ldots$$

$$\vec{D}_N + \vec{L}_N + \vec{W}_N - \vec{T}_{N-1} - \vec{T}_N + \vec{F}_{C,N} = \vec{0}$$

wherein the subscripts S and B represent the first and second aircraft, respectively, and numerical subscripts represent segments of the tether connecting the two aircraft, and wherein the vectors D, L, W, T, and $F_C$, represent the estimated drag, lift, weight, tether tension, and correction forces, respectively.

* * * * *